United States Patent [19]
Yamada et al.

[11] 4,064,443
[45] Dec. 20, 1977

[54] CONTROL SYSTEM FOR D.C. MOTOR

[75] Inventors: Isao Yamada, Chigasaki; Isamu Shibata, Musashino, both of Japan

[73] Assignee: Ricoh Co., Ltd., Japan

[21] Appl. No.: 636,996

[22] Filed: Dec. 2, 1975

[30] Foreign Application Priority Data
Dec. 13, 1974  Japan .................................. 49-143604

[51] Int. Cl.² ............................................ H02P 5/00
[52] U.S. Cl. ................................. 318/331; 318/341; 318/434
[58] Field of Search ............... 318/331, 341, 599, 430, 318/432, 434

[56] References Cited
U.S. PATENT DOCUMENTS

| | | | |
|---|---|---|---|
| 3,488,756 | 1/1970 | Skrivanek, Jr. | 318/331 |
| 3,588,654 | 6/1971 | Balazs | 318/331 |
| 3,683,253 | 8/1972 | Rummel et al. | 318/341 |
| 3,694,721 | 9/1972 | Henry | 318/341 |
| 3,783,360 | 1/1974 | Bundy | 318/341 |
| 3,883,786 | 5/1975 | McNaughton | 318/341 |
| 3,976,926 | 5/1976 | Egbert | 318/341 |

Primary Examiner—Robert K. Schaefer
Assistant Examiner—Eugene S. Indyk
Attorney, Agent, or Firm—McGlew and Tuttle

[57] ABSTRACT

In the control system, the motor is supplied power in the form of a pulse train. The width of each pulse of the pulse train is modulated through the comparison between a reference voltage and the counter e.m.f. of the motor immediately prior to feeding of each pulse of the pulse train into the motor.

1 Claim, 3 Drawing Figures

CONTROL SYSTEM FOR D.C. MOTOR

BACKGROUND OF THE INVENTION

The invention relates to an improvement in a control system of a d.c. motor.

The rotation speed of a d.c. motor can be controlled either by voltage control or by a mechanical governor. A typical voltage control system is illustrated in FIG. 1, wherein a d.c. motor 1 and a control transistor 2 are connected in series across the terminals of a d.c. source E. A variation in the load of the motor 1 is fed back to the base of the control transistor 2 as a control voltage, to thereby change the voltage $V_1$ developed across the collector and emitter of the transistor so as to maintain the speed or RPM of the motor 1 at a given value. With this voltage control, the series connection of the transistor 2 with the motor 1 causes a power dissipation of $V_1$ in the transistor, where i represents the motor current, thus resulting in a lower power efficiency. As a consequence, such control is not conducive to a small instrument which utilizes a dry cell or the like as the d.c. source. The mechanical governor control depends on a mechanical displacement of the governor, resulting from a deviation in the RPM of the motor, to provide a mechanical switching of the connection between the power source and the motor, thus maintaining the RPM of the motor a given value. However, while this improves the power efficiency, the mechanical control tends to generate noises and other adverse influences upon the circuit as a result of the switching operation. In addition, it is not easily possible to alter the RPM or angular velocity.

SUMMARY OF THE INVENTION

It is an object of the invention to eliminate the above-mentioned disadvantages by providing a control system for a d.c. motor which assures an improved power efficiency and enables a change in the RPM or angular velocity of the d.c. motor while avoiding the generation of noises.

DETAILED DESCRIPTION OF AN EMBODIMENT

Figure 2:
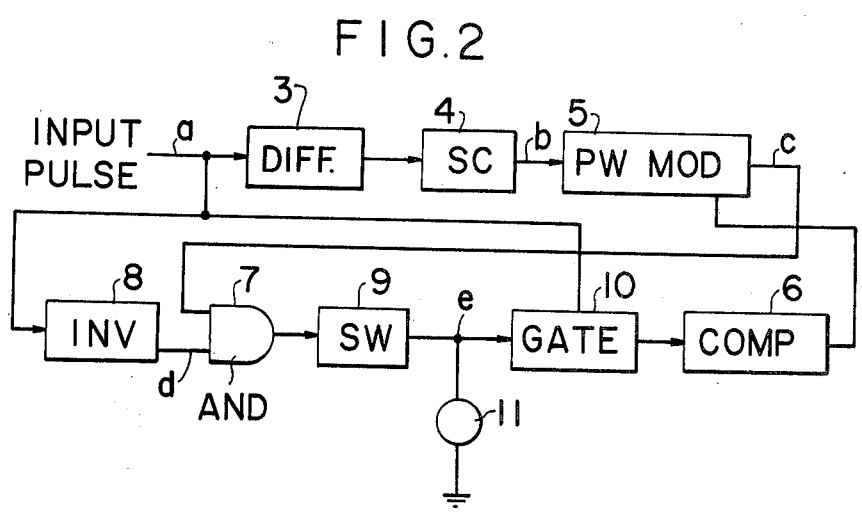
FIG. 2 is a block diagram of one embodiment of the invention.

Referring to FIG. 2, an input pulse a having a constant period, as illustrated in FIG. 3a, is generated by a pulse generator and applied to a differentiator 3, which differentiates the input pulse and supplies it to a waveform shaper 4, producing a pulse b having a leading edge which is in time coincidence with the trailing edge of the input pulse, as shown in FIG. 3b. The output pulse from the waveform shaper 4 triggers a pulse width modulator 5, producing a pulse c output as shown in FIG. 3c. The width of the pulse output from the modulator 5 varies in accordance with the output voltage from a voltage comparator 6. The output pulse from the modulator 5 is applied to one input of an AND circuit 7, the other input terminal of which receives an output FIG. 3d pulse d from an inverter 8 which receives the input pulse. A switching circuit 9 is driven by the output from the AND circuit 7 to conduct the current to a d.c. motor 11 only during a time interval $T_1$ which is determined by the pulse width of the output from the modulator 5.

Figure 1:
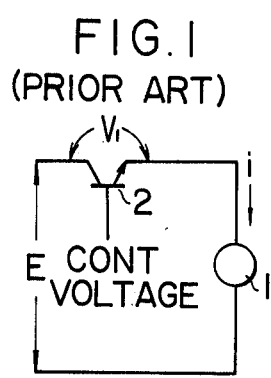
FIG. 1 is a schematic diagram illustrating a conventional voltage control.
Figure 3:
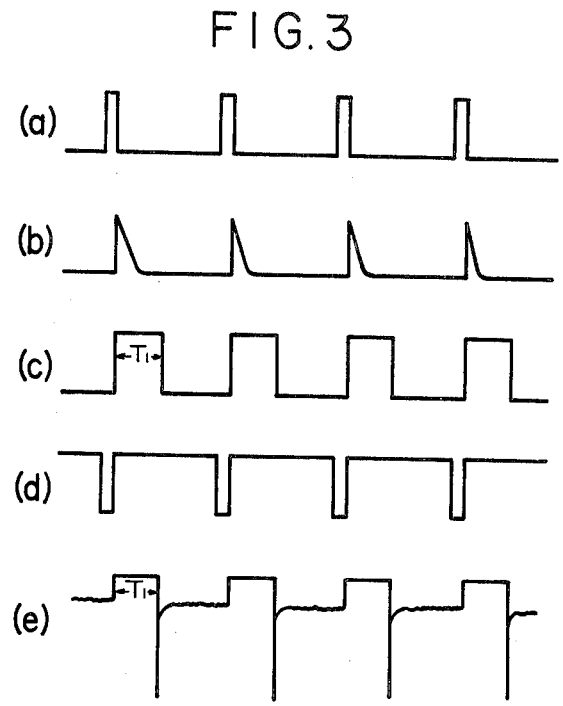
FIGS. 3a to 3e graphically show the various signals appearing in the system of the invention.

During the time when the d.c. motor 11 is not energized, or immediately prior to its energization, a gate 10 is enabled by the input pulse e, corresponding to FIG. 3 to pass the counter e.m.f. of the motor 11 to the comparator 6, which compares it against a reference voltage. The output voltage from the voltage comparator 6 is applied to the pulse width modulator 5 so as to control the time interval $T_1$ during which the motor 11 is energized, thus forming a servo loop. In this manner, the motor 11 is controlled so that its RPM corresponds to the reference voltage applied to the comparator 6, and the RPM can be arbitrarily changed by varying the reference voltage. The elimination of a control transistor, such as shown in FIG. 1, improves the power efficiency, and the occurrence of noises is avoided.

FIG. 3 part c shows the output waveform from the pulse width modulator 5. The motor 11 is driven by the portion T1 shown in FIG. 3c of this waveform. The width T1 is broadened when the motor is started. In an extreme case, the intervals of the adjacent pulse waveforms disappear and each waveform becomes united. As a result, the upper line of the pulse waveform becomes one straight line, that is the pulse width T1 and the pulse interval become equal.

In a short time after the motor is started, the pulse width, which has extended in the form of a straight line, becomes gradually smaller and at its end its waveform becomes the waveform shown in FIG. 3c.

The inverter 8 and the circuit 7 are able to detect the counter EMF from the motor 11 even after the start of the motor by cutting the output waveform from the modulator 5, that is, the driving waveform supplied to the motor, which is in a united form of the adjacent pulses immediately after the start of the motor.

When the output of the pulse width modulator 5 is connected to the SW9 without using the inverter 8 and the circuit 7, the waveform from the modulator 5 immediately after the start of the motor is in the form of each waveform being united as mentioned above.

This not only the counter EMF but also the overlapped output of the counter EMF and the output voltage of the pulse width modulator 5 is detected. Consequently the sole detection of the EMF cannot be made.

What is claimed is:

1. A control system, for a d.c. motor supplied by a pulse train, comprising, in combination, generating means generating a first pulse train; differentiating means differentiating said first pulse train to produce a trigger pulse train; means, responsive to each pulse of said trigger pulse train and to a respective control signal, producing respective pulses which, together, constitute a second pulse train for supply to the motor; a reference voltage source; means comparing the reference voltage and the counter e.m.f. of the motor, prior to feeding each pulse of said second pulse train into the motor, to produce said control signal, AND gate means having an output connected to the motor; a first input connected to said generating means, and a second input; and an inverter having an input connected to said producing means and an output connected to said second input of said AND gate means.

* * * * *